J. J. MORRIS.
LOCK.
APPLICATION FILED NOV. 8, 1918.

1,346,763. Patented July 13, 1920.

Witnesses
W. A. Thomas

Inventor
Joseph John Morris
By Victor J. Evans
Attorney

UNITED STATES PATENT OFFICE.

JOSEPH JOHN MORRIS, OF STOCKTON, CALIFORNIA.

LOCK.

1,346,763.  Specification of Letters Patent.  Patented July 13, 1920.

Application filed November 8, 1918. Serial No. 261,636.

*To all whom it may concern:*

Be it known that I, JOSEPH JOHN MORRIS, a citizen of the United States, residing at Stockton, in the county of San Joaquin and State of California, have invented new and useful Improvements in Locks, of which the following is a specification.

This invention relates to devices for locking an automobile during the absence of the owner or person in charge of the machine by unauthorized persons.

The primary object of the invention is to produce a locking means of this character which may be easily applied to the steering column and steering post of any ordinary make of automobiles, so that the same may be arranged thereon at any desired or convenient height with respect to the driver.

A further and important object of the invention is to produce a device of this character which shall be of an extremely simple construction, cheap to manufacture, readily applied, and thoroughly efficient in operation.

The foregoing objects may be accomplished by a simple construction, combination and operative arrangement of parts set forth in the following description and disclosed in the drawings.

Figure 1:
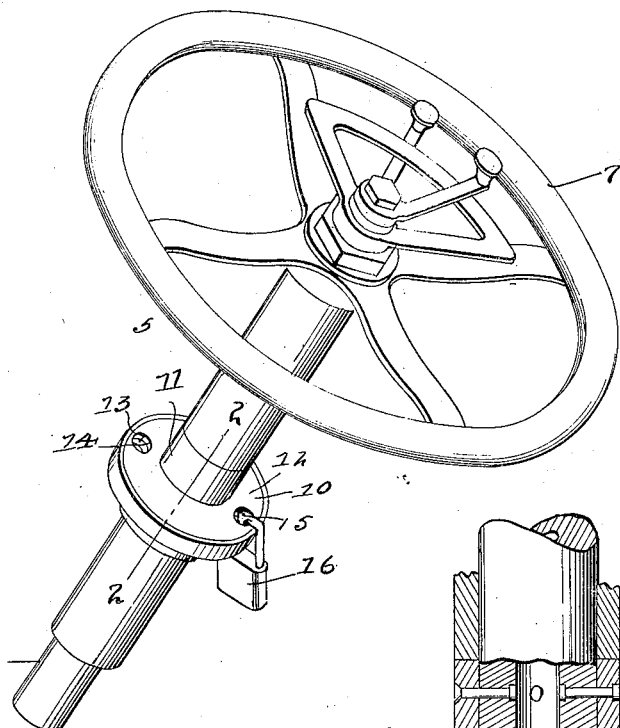
Figure 1 is a perspective view illustrating the application of the improvement.
Figure 2:
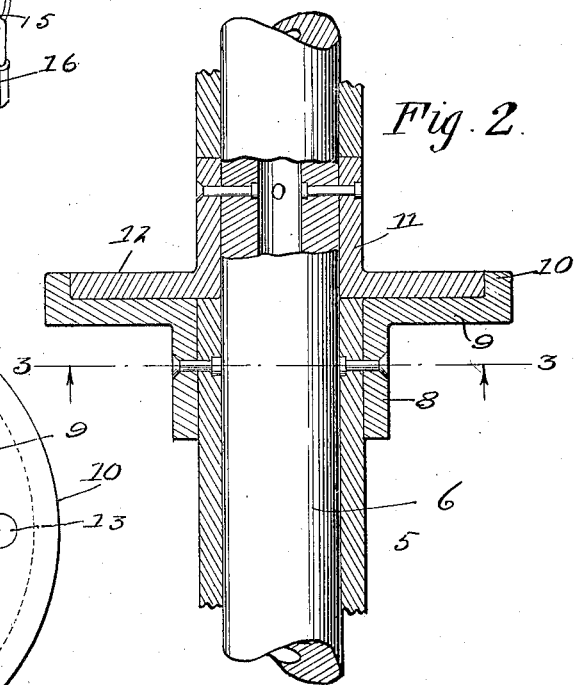
Fig. 2 is a greatly enlarged sectional view approximately on the line 2—2 of Fig. 1.
Figure 3:
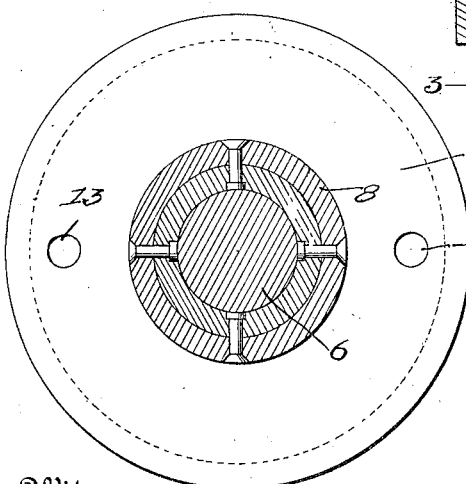
Fig. 3 is a sectional view approximately on the line 3—3 of Fig. 2.

In the drawings the numeral 5 designates a column having a steering post 6 of any ordinary make of automobiles. The column 5, at a suitable distance below the steering wheel 7 that is attached to the post 6 may be cut and has secured to the upper end thereof a collar 8 which has its outer end integrally formed with a flat round plate or flange 9, and this plate or flange 9 may, if desired, be provided with a peripheral flange 10. Preferably the collar 8 may be secured upon the column 5 by rivets, or if desired the same may be welded to the column. The collar and the plate or flange 9 formed therewith are constructed of some suitable hardened material so that the same can not be readily broken.

On the steering post 6 is secured a collar 11. This collar may be welded to the post or connected thereto by rivets and has upon its lower end an annular flange 12 that is designed to be received on the flange or plate 9 and to be surrounded by the peripheral flange 10. The plate or flange 9 and the plate or flange 12 are provided, at spaced intervals with openings 13 and 14 respectively which aline, when the steering post is turned to one position on the column and through the alining openings is adapted to pass the shackle 15 of a lock 16. The lock may be suspended from the plate 9 by a flexible element, and the key therefor is retained in the possession of the owner. It will be apparent that when the owner applies the lock the steering apparatus can not be operated, and thus danger of the machine becoming stolen is entirely overcome.

Having thus described the invention, what is claimed as new, is:—

In combination with the column and the steering post of an automobile, of a collar secured to the upper end of the steering column, an outwardly extending flat round plate integrally formed on the upper edge of the collar, a peripheral flange on the plate, said plate having an opening therethrough, a collar secured on the steering post, an outwardly extending flat round flange on the lower edge of said collar designed to rest on the mentioned plate and to be surrounded by the peripheral flange of the said plate, and said flange having an opening adapted to register with the opening in the plate, when the steering post is turned to one position, and to receive the shackle of a lock therethrough.

In testimony whereof I affix my signature.

JOSEPH JOHN MORRIS.